(12) United States Patent
Kurian et al.

(10) Patent No.: US 8,066,923 B2
(45) Date of Patent: Nov. 29, 2011

(54) POLY(TRIMETHYLENE TEREPHTHALATE)/POLY(ALPHA-HYDROXY ACID) BICONSTITUENT FILAMENTS

(75) Inventors: Joseph V. Kurian, Hockessin, DE (US); Richard E. Godwin, Wilmington, DE (US); Jing-Chung Chang, Boothwyn, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 71 days.

(21) Appl. No.: 12/652,756

(22) Filed: Jan. 6, 2010

(65) Prior Publication Data
US 2010/0105841 A1 Apr. 29, 2010

Related U.S. Application Data

(60) Division of application No. 11/605,662, filed on Nov. 29, 2006, now Pat. No. 7,666,501, which is a continuation-in-part of application No. 11/296,157, filed on Dec. 7, 2005, now abandoned.

(51) Int. Cl.
*D01D 5/36* (2006.01)
*D01F 8/14* (2006.01)

(52) U.S. Cl. .......... 264/172.13; 264/172.17; 264/211.12

(58) Field of Classification Search .............. 264/172.13, 264/172.17, 211.12
See application file for complete search history.

(56) References Cited

U.S. PATENT DOCUMENTS

| | | | |
|---|---|---|---|
| 3,589,956 A | 6/1971 | Kranz et al. | |
| 3,671,379 A | 6/1972 | Evans et al. | |
| 5,015,789 A | 5/1991 | Arntz et al. | |
| 5,180,765 A | 1/1993 | Sinclair | |
| 5,276,201 A | 1/1994 | Haas et al. | |
| 5,284,979 A | 2/1994 | Haas et al. | |
| 5,334,778 A | 8/1994 | Haas et al. | |
| 5,340,909 A | 8/1994 | Doerr et al. | |
| 5,364,984 A | 11/1994 | Arntz et al. | |
| 5,364,987 A | 11/1994 | Haas et al. | |
| 5,391,263 A | 2/1995 | Hepner et al. | |
| 5,434,239 A | 7/1995 | Bhatia | |
| 5,504,122 A | 4/1996 | Michel et al. | |
| 5,510,454 A | 4/1996 | Stouffer et al. | |
| 5,532,333 A | 7/1996 | Stouffer et al. | |
| 5,532,404 A | 7/1996 | Gallagher | |
| 5,540,868 A | 7/1996 | Stouffer et al. | |
| 5,633,018 A | 5/1997 | Stouffer et al. | |
| 5,633,362 A | 5/1997 | Nagarajan et al. | |
| 5,645,782 A | 7/1997 | Howell et al. | |
| 5,677,415 A | 10/1997 | Bhatia | |
| 5,686,276 A | 11/1997 | Laffend et al. | |
| 5,710,315 A | 1/1998 | Gallagher | |
| 5,714,262 A | 2/1998 | Stouffer et al. | |
| 5,730,913 A | 3/1998 | Stouffer et al. | |
| 5,763,104 A | 6/1998 | Stouffer et al. | |
| 5,774,074 A | 6/1998 | Cooper et al. | |
| 5,786,443 A | 7/1998 | Lowe | |
| 5,798,433 A | 8/1998 | Schmidt et al. | |
| 5,811,496 A | 9/1998 | Iwasyk et al. | |
| 5,821,092 A | 10/1998 | Nagarajan et al. | |
| 5,830,982 A | 11/1998 | Stouffer et al. | |
| 5,840,957 A | 11/1998 | Kurian et al. | |
| 5,856,423 A | 1/1999 | Bhatia | |
| 5,962,745 A | 10/1999 | Brossmer et al. | |
| 5,990,265 A | 11/1999 | Blanchard et al. | |
| 6,096,809 A | 8/2000 | Lorcks et al. | |
| 6,109,015 A | 8/2000 | Roark et al. | |
| 6,113,825 A | 9/2000 | Chuah | |
| 6,139,954 A | 10/2000 | Dean et al. | |
| 6,231,976 B1 | 5/2001 | Dean et al. | |
| 6,232,511 B1 | 5/2001 | Haas et al. | |
| 6,235,948 B1 | 5/2001 | Sunkara et al. | |
| 6,245,844 B1 | 6/2001 | Kurian et al. | |
| 6,255,442 B1 | 7/2001 | Kurian et al. | |
| 6,277,289 B1 | 8/2001 | Kurian et al. | |
| 6,281,325 B1 | 8/2001 | Kurian et al. | |
| 6,289,688 B1 | 9/2001 | da Luz Moraes et al. | |
| 6,297,408 B1 | 10/2001 | Haas et al. | |
| 6,312,805 B1 | 11/2001 | Sun | |
| 6,325,945 B2 | 12/2001 | Kurian et al. | |
| 6,331,264 B1 | 12/2001 | Kurian et al. | |
| 6,333,106 B2 | 12/2001 | Howell et al. | |
| 6,335,421 B1 | 1/2002 | Kurian et al. | |
| 6,350,895 B1 | 2/2002 | Kurian | |
| 6,353,062 B1 | 3/2002 | Giardino et al. | |
| 6,437,193 B1 | 8/2002 | Contractor et al. | |
| 6,497,950 B1 | 12/2002 | Haile et al. | |
| 6,538,076 B2 | 3/2003 | Giardino et al. | |
| 6,582,818 B2 | 6/2003 | Haile et al. | |
| 6,672,047 B1 | 1/2004 | Howell et al. | |
| 6,740,276 B2 | 5/2004 | Agarwal et al. | |
| 6,770,356 B2 | 8/2004 | O'Donnell et al. | |
| 6,777,059 B2 | 8/2004 | Kurian et al. | |
| 6,841,505 B2 | 1/2005 | Eng | |
| 6,887,953 B2 | 5/2005 | Eng | |
| 6,923,925 B2 | 8/2005 | Chang et al. | |
| 7,038,092 B2 | 5/2006 | Sunkara et al. | |
| 7,338,877 B1 | 3/2008 | Meyer et al. | |
| 2002/0009590 A1 * | 1/2002 | Matsui et al. ................. | 428/374 |
| 2002/0127939 A1 | 9/2002 | Hwo et al. | |
| 2002/0133049 A1 * | 9/2002 | Hilaly et al. ................. | 568/872 |
| 2003/0055206 A1 | 3/2003 | Haile et al. | |

(Continued)

FOREIGN PATENT DOCUMENTS

EP 0 699 700 A2 3/1996

(Continued)

*Primary Examiner* — Leo B Tentoni

(57) ABSTRACT

This invention relates to poly(trimethylene terephthalate)/poly(alpha-hydroxy acid) biconstituent filaments, methods for making the same and end uses thereof.

8 Claims, No Drawings

U.S. PATENT DOCUMENTS

| | | |
|---|---|---|
| 2003/0082360 A1 | 5/2003 | O'Donnell et al. |
| 2003/0200991 A1 | 10/2003 | Keck et al. |
| 2004/0023014 A1 | 2/2004 | Williamson et al. |
| 2004/0093831 A1 | 5/2004 | Busch et al. |
| 2004/0121679 A1 | 6/2004 | Ortega |
| 2004/0198120 A1 | 10/2004 | Scott et al. |
| 2004/0209073 A1 | 10/2004 | Rosenbaum et al. |
| 2004/0225161 A1 | 11/2004 | Sunkara et al. |
| 2004/0260125 A1 | 12/2004 | Seapan et al. |
| 2005/0069997 A1 | 3/2005 | Adkesson et al. |
| 2005/0203258 A1 | 9/2005 | Kimura et al. |
| 2007/0128436 A1 | 6/2007 | Kurian et al. |
| 2007/0129503 A1 | 6/2007 | Kurian et al. |
| 2010/0029158 A1 * | 2/2010 | Kamiyama et al. .. 264/172.13 X |

FOREIGN PATENT DOCUMENTS

| | | |
|---|---|---|
| EP | 0 847 960 A1 | 6/1998 |
| EP | 1 167 594 A1 | 1/2002 |
| JP | 1996004797 A | 1/1996 |
| JP | 2001064413 A | 3/2001 |
| JP | 2001355638 A | 12/2001 |
| JP | 2002128918 A | 5/2002 |
| JP | 2002146071 A | 5/2002 |
| JP | 2003041435 A | 2/2003 |
| JP | 2003082527 A | 3/2003 |
| JP | 2003119626 A | 4/2003 |
| JP | 2004175831 A | 6/2004 |
| JP | 2004190026 A | 7/2004 |
| JP | 2004250500 A | 9/2004 |
| JP | 2004250549 A | 9/2004 |
| JP | 2004277939 A | 10/2004 |
| WO | WO 00/56807 | 9/2000 |
| WO | WO 00/26301 | 11/2000 |
| WO | WO 01/75200 A1 | 10/2001 |
| WO | WO-2005095686 A1 * | 10/2005 |

* cited by examiner

POLY(TRIMETHYLENE TEREPHTHALATE)/POLY(ALPHA-HYDROXY ACID) BICONSTITUENT FILAMENTS

CROSS-REFERENCE TO RELATED APPLICATIONS

This application is a divisional of U.S. Pat. No. 7,666,501 (filed Nov. 29, 2006) now U.S. Pat. No. 7,666,501, which is a continuation-in-part of U.S. patent application Ser. No. 11/296,157 (filed Dec. 7, 2005, now abandoned), the disclosure of which is incorporated by reference herein for all purposes as if fully set forth. This application is related to U.S. Published Patent Application No. 20070129503 (filed Nov. 29, 2006, now abandoned), entitled "POLY(TRIMETHYLENE TEREPHTHALATE)/POLY(ALPHA-HYDROXY ACID) MOLDED, SHAPED ARTICLES", which was a continuation-in-part of application Ser. No. 11/296,176 (filed Dec. 7, 2005, now abandoned).

FIELD OF THE INVENTION

This invention relates to poly(trimethylene terephthalate)/poly(alpha-hydroxy acid) biconstituent filaments, methods for making the same and end uses thereof.

BACKGROUND OF THE INVENTION

Poly(trimethylene terephthalate) ("PTT") and its use in many applications, including fibers, has been described in the literature. PTT is a polyester derived from terephthalic acid or an ester thereof and trimethylene glycol (also known as 1,3-propanediol) ("PDO"). The PDO may be prepared by various chemical or biochemical routes, including from various sugar sources such as corn, and thus can be prepared from a renewable resource. New PTT filaments having improved strength and stiffness (demonstrated by higher modulus) have been desired.

In addition, since terephthalic acid and its esters are presently prepared from petroleum base, it is desired to increase the green (renewable resource base) of PTT compositions without harming the overall properties of products.

Japanese Patent Publication No. 2003-041435 describes mixtures of PTT and 1-10 wt % of a polyester consisting essentially of polylactic acid. The mixtures are used to prepare hollow, crimped staple fibers. Poly(lactic acid) can also be prepared from a renewable resource, being prepared from lactic acid (2-hydroxypropionic acid) and its intermolecular esters that are in turn prepared from carbohydrates by lactic acid fermentation. Japanese Patent Publication No. 2003-041435 is focused on using polylactic acid to provide a more stable crimp.

SUMMARY OF THE INVENTION

This invention is directed to a continuous, biconstituent filament comprising poly(trimethylene terephthalate) and about 0.5 to about 18 wt %, by weight of the filaments, of poly(alpha-hydroxy acid).

Preferably the continuous, biconstituent filament comprises about 5 to about 15 wt %, by weight of the composition, of the poly(alpha-hydroxy acid). More preferably the continuous, biconstituent filament comprises about 8 to about 12 wt %, by weight of the composition, of the poly(alpha-hydroxy acid).

Preferably the continuous, biconstituent filament comprises about 82 to about 95.5 wt %, by weight of the composition, of the poly(trimethylene terephthalate). More preferably the continuous, biconstituent filament comprises about 85 to about 95 wt %, by weight of the composition, of the poly(trimethylene terephthalate). Most preferably the continuous, biconstituent filament comprises about 88 to about 92 wt %, by weight of the composition, of the poly(trimethylene terephthalate).

Preferably, the poly(trimethylene terephthalate) is made with a 1,3-propane diol prepared by a fermentation process using a renewable biological source.

Preferably the poly(alpha-hydroxy acid) is polylactic acid, more preferably a bio-derived polylactic acid.

Preferably the continuous, biconstituent filament is about 0.5 to about 35 dpf. In another preferred embodiment, the continuous, biconstituent filament of claim 1 is a monofilament of about 10 to about 2000 dpf.

The invention is also directed to a process of preparing continuous, biconstituent filaments comprising the steps of: (a) providing a melt composition comprising poly(trimethylene terephthalate) and about 0.5 to about 18 wt %, by weight of the composition, of poly(alpha-hydroxy acid); and (b) forming continuous, biconstituent filaments from the composition.

DETAILED DESCRIPTION OF THE PREFERRED EMBODIMENTS

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Except where expressly noted, trademarks are shown in upper case.

The materials, methods, and examples herein are illustrative only and, except as specifically stated, are not intended to be limiting. Although methods and materials similar or equivalent to those described herein can be used in the practice or testing of the present invention, suitable methods and materials are described herein.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or"

refers to an inclusive or and not to an exclusive or. For example, a condition A or B is satisfied by any one of the following: A is true (or present) and B is false (or not present), A is false (or not present) and B is true (or present), and both A and B are true (or present).

Use of "a" or "an" are employed to describe elements and components of the invention. This is done merely for convenience and to give a general sense of the invention. This description should be read to include one or at least one and the singular also includes the plural unless it is obvious that it is meant otherwise.

This invention relates to polymer compositions, melt-blended polyester mixtures, and continuous, biconstituent filaments comprising poly(trimethylene terephthalate)s and polymers of alpha-hydroxy acids. The amount of the polymer of alpha-hydroxy acid or acids is at least about 0.5%, more preferably at least about 1%, and more preferably at least about 2%, more preferably at least about 5%, and most preferably at least about 8%. The amount of the polymer of an alpha-hydroxy acid is up to about 18%, preferably up to about 15%, and most preferably up to about 12%. Preferably the poly(trimethylene terephthalate) is used in an amount of up to about 99.5%, more preferably up to about 99%, even more preferably up to about 98%, most preferably up to about 95% and most preferably up to 92%. It is preferably used in amount of at least about 82%, more preferably of at least about 85%, and most preferably of at least about 88%. The foregoing are weight percentages, and are based upon the total weight of the polymer compositions, melt-blended polyester mixtures, and continuous, biconstituent filaments, respectively. For convenience, polymer compositions of the invention are sometimes referred to as "PTT/PAHA polymers".

Poly(trimethylene terephthalate) or PTT, is meant to encompass homopolymers and copolymers containing at least 70 mole % trimethylene terephthalate repeat units. The preferred poly(trimethylene terephthalate)s contain at least 85 mole %, more preferably at least 90 mole %, even more preferably at least 95 or at least 98 mole %, and most preferably about 100 mole %, trimethylene terephthalate repeat units.

Poly(trimethylene terephthalate) is generally produced by the acid-catalyzed polycondensation of 1,3-propane diol and terephthalic acid/diester, with optional minor amounts of other monomers.

When the PTT is a copolymer, it can contain up to 30 mole %, preferably up to 15 mole %, more preferably up 10 mole %, even more preferably up to 5 mole %, and most preferably up to 2 mole %, and of repeating units that contain other units. These repeating unit preferably contain dicarboxylic acids having 4-12 carbon atoms (for example butanedioic acid, pentanedioic acid, hexanedioic acid, dodecanedioic acid, and 1,4-cyclo-hexanedicarboxylic acid); aromatic dicarboxylic acids other than terephthalic acid and having 8-12 carbon atoms (for example isophthalic acid and 2,6-naphthalenedicarboxylic acid); and linear, cyclic, and branched aliphatic diols having 2-8 carbon atoms other than 1,3-propanediol (for example, ethanediol, 1,2-propanediol, 1,4-butanediol, 3-methyl-1,5-pentanediol, 2,2-dimethyl-1,3-propanediol, 2-methyl-1,3-propanediol, and 1,4-cyclohexanediol).

The poly(trimethylene terephthalate) can contain minor amounts of other comonomers, and such comonomers are usually selected so that they do not have a significant adverse affect on properties. Such other comonomers include 5-sodium-sulfoisophthalate, for example, at a level in the range of about 0.2 to 5 mole %. Very small amounts of trifunctional comonomers, for example trimellitic acid, can be incorporated for viscosity control.

A particular preferred poly(trimethylene terephthalate) is one in which the 1,3-propane diol used to make the polymer comprises (preferably substantially comprises) a 1,3-propane diol prepared by a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in the species Klebsiella, Citrobacter, Clostridium, and Lactobacillus. The technique is disclosed in several publications, including U.S. Pat. No. 5,633,362, U.S. Pat. No. 5,686,276 and U.S. Pat. No. 5,821,092. U.S. Pat. No. 5,821,092 discloses, inter alia, a organisms. The process incorporates E. coli bacteria, transformed with a heterologous pdu diol dehydratase gene, having specificity for 1,2-propanediol. The transformed E. coli is grown in the presence of glycerol as a carbon source and 1,3-propanediol is isolated from the growth media. Since both bacteria and yeasts can convert glucose (e.g., corn sugar) or other carbohydrates to glycerol, the processes disclosed in these publications provide a rapid, inexpensive and environmentally responsible source of 1,3-propanediol monomer.

The biologically-derived 1,3-propanediol, such as produced by the processes described and referenced above, contains carbon from the atmospheric carbon dioxide incorporated by plants, which compose the feedstock for the production of the 1,3-propanediol. In this way, the biologically-derived 1,3-propanediol preferred for use in the context of the present invention contains only renewable carbon, and not fossil fuel-based or petroleum-based carbon. The poly (trimethylene terephthalates) based thereon utilizing the biologically-derived 1,3-propanediol, therefore, have less impact on the environment as the 1,3-propanediol used in the compositions does not deplete diminishing fossil fuels and, upon degradation, releases carbon back to the atmosphere for use by plants once again.

Preferably the 1,3-propanediol used as the reactant or as a component of the reactant will have a purity of greater than about 99%, and more preferably greater than about 99.9%, by weight as determined by gas chromatographic analysis. Particularly preferred are the purified 1,3-propanediols as disclosed in U.S. Pat. No. 7,038,092, US2004-0260125A1, US2004-0225161A1 and US2005-0069997A1.

The purified 1,3-propanediol preferably has the following characteristics:

(1) an ultraviolet absorption at 220 nm of less than about 0.200, and at 250 nm of less than about 0.075, and at 275 nm of less than about 0.075; and/or (2) a composition having L*a*b* "b*" color value of less than about 0.15 (ASTM D6290), and an absorbance at 270 nm of less than about 0.075; and/or (3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

The intrinsic viscosity of the poly(trimethylene terephthalate) of the invention is at least about 0.5 dL/g, preferably at least about 0.7 dL/g, more preferably at least about 0.8 dL/g, more preferably at least about 0.9 dL/g, and most preferably at least about 1 dL/g. The intrinsic viscosity of the polyester composition of the invention are preferably up to about 2 dL/g, more preferably up to about 1.5 dL/g, and most preferably up to about 1.2 dL/g.

Poly(trimethylene terephthalate) and preferred manufacturing techniques for making poly(trimethylene terephthalate) are described in U.S. Pat. No. 5,015,789, U.S. Pat. No. 5,276,201, U.S. Pat. No. 5,284,979, U.S. Pat. No. 5,334,778, U.S. Pat. No. 5,364,984, U.S. Pat. No. 5,364,987, U.S. Pat. No. 5,391,263, U.S. Pat. No. 5,434,239, U.S. Pat. No. 5,510,454, U.S. Pat. No. 5,504,122, U.S. Pat. No. 5,532,333, U.S. Pat. No. 5,532,404, U.S. Pat. No. 5,540,868, U.S. Pat. No. 5,633,018, U.S. Pat. No. 5,633,362, U.S. Pat. No. 5,677,415, U.S. Pat. No. 5,686,276, U.S. Pat. No. 5,710,315, U.S. Pat. No. 5,714,262, U.S. Pat. No. 5,730,913, U.S. Pat. No. 5,763,104, U.S. Pat. No. 5,774,074, U.S. Pat. No. 5,786,443, U.S. Pat. No. 5,811,496, U.S. Pat. No. 5,821,092, U.S. Pat. No. 5,830,982, U.S. Pat. No. 5,840,957, U.S. Pat. No. 5,856,423, U.S. Pat. No. 5,962,745, U.S. Pat. No. 5,990,265, U.S. Pat. No. 6,232,511, U.S. Pat. No. 6,235,948, U.S. Pat. No. 6,245,844, U.S. Pat. No. 6,255,442, U.S. Pat. No. 6,277,289, U.S. Pat. No. 6,281,325, U.S. Pat. No. 6,297,408, U.S. Pat. No. 6,312,805, U.S. Pat. No. 6,325,945, U.S. Pat. No. 6,331,264, U.S. Pat. No. 6,335,421, U.S. Pat. No. 6,350,895, U.S. Pat. No. 6,353,062, U.S. Pat. No. 6,437,193, U.S. Pat. No. 6,538,076, U.S. Pat. No. 6,841,505 and U.S. Pat. No. 6,887,953.

Poly(trimethylene terephthalate)s useful as the polyester of this invention are commercially available from E. I. du Pont de Nemours and Company, Wilmington, Del., under the trademark SORONA, and from Shell Chemicals, Houston, Tex., under the trademark CORTERRA.

The polymerized alpha-hydroxy acids ("PAHA") used in the practice of the present invention include polymers of lactic acid (including polymers of its stereo-specific dimer L(-)lactide), glycolic acid (including its dimer glycolide), and 2-hydroxy butyric acid. Also included in the term "polymerized alpha-hydroxy acid" are copolymers of PLA such as the copolymers of PLA and $\epsilon$-caprolactone (2-oxepanone) and/or $\gamma$-caprolactone (5-ethyl-2-oxolanone).

The preferred poly(lactic acid) (PLA) used in the practice of the present invention is a 100% bio-derived polymer, prepared catalytically from L(-)lactide, preferably having a melting point of 130-200° C. The intrinsic viscosity of the PLA used in the practice of the present invention is preferably at least about 0.7 dL/g, more preferably at least about 0.9 dL/g, and is preferably at up to about 2.0 dL/g, more preferably up to about 1.6 dL/g.

PLA's suitable for practicing this invention are available from Cargill, Inc., Minetonka, Minn., and one preferred grade is PLA Polymer 4040D, and others.

Thus, the preferred filaments of the present invention containing biologically derived 1,3-propane diol in the poly(trimethylene terephthalate) and bio-derived PLA, can be characterized as more natural and having less environmental impact than similar compositions comprising petroleum based counterparts.

The PTT/PAHA polymers can be prepared by any known technique, including physical blends and melt blends. Preferably the PTT and PAHA are melt blended and compounded. Preferably PTT and PAHA are mixed and heated at a temperature sufficient to form a blend, and upon cooling, the blend is formed into a shaped article, such as pellets. The PTT and PAHA can be formed into a blend in many different ways. For instance, they can be (a) heated and mixed simultaneously, (b) pre-mixed in a separate apparatus before heating, or (c) heated and then mixed. As an example, the polymer blend can be made by transfer line injection. The mixing, heating and forming can be carried out by conventional equipment designed for that purpose such as extruders, Banbury mixers or the like. The temperature should be above the melting points of each component, but below the lowest decomposition temperature, and accordingly must be adjusted for any particular composition of PAT and PAHA. Temperature is typically in the range of about 180° C. to about 260° C., preferably at least about 230° C. and more preferably up to about 250° C., depending on the particular PTT and PAHA of the invention.

The polymer compositions can, if desired, contain additives, e.g., delusterants, heat stabilizers, viscosity boosters, optical brighteners, pigments, and antioxidants. TiO2 or other pigments can be added to the PTT, PAHA, the blend, or in filament manufacture. See, e.g., U.S. Pat. No. 3,671,379, U.S. Pat. No. 5,798,433, U.S. Pat. No. 5,340,909, EP-A-0699700, EP-A-0847960 and WO00/026301.

Polyamides such as Nylon 6 or Nylon 6-6 can be added in minor amounts, for instance about 0.5 to about 15 wt %, based upon the weight of the PTT, to improve properties (e.g. strength) and processability to the compositions of the invention.

The compositions and filaments can be prepared using styrene polymer, such as described in U.S. Pat. No. 6,923,925. Preferably they contain about 0.1 to about 10 wt % styrene polymer, by weight of the polymer in the polymer composition (or by weight of the continuous, biconstituent filament in the case of a continuous, biconstituent filament). The styrene polymer is dispersed in the polymer composition and the filaments contain styrene polymer dispersed throughout the filaments. Preferably the styrene polymer number average molecular weight is at least about 50000 and preferably is up to about 300000, as describe in the patent. The styrene polymer is preferably selected from the group consisting of polystyrene, $\alpha$-methyl-polystyrene, and styrene-butadiene copolymers and blends thereof, and is most preferably polystyrene.

The polymer compositions of the invention can be readily converted into continuous, biconstituent filaments. They can be converted into pellets, remelted and spun into filaments, or used directly to the spinning process. (The term "pellets" is used generically in this regard, and is used regardless of shape sometimes called "chips", "flakes", etc.) The polymer compositions can be spun into filaments for apparel, flooring, and other applications where the filaments are needed, and can be prepared using conventional polymer and filament making equipment. As described elsewhere, the polymer compositions of the invention provide novel changes in physical properties over PTT itself.

The filaments of this invention are biconstituent filaments. By "biconstituent filament" is meant a filament comprising a polymer continuous and at least one polymer discontinuous phase. Biconstituent filaments are formed from at least two polymers, one of which forms the continuous phase and the other(s) being in one or more discontinuous phases dispersed throughout the filament, wherein the at least two polymers are extruded from the same extruder as a blend. The PTT forms the continuous phase. The PAHA polymer(s) form a discontinuous phase and is highly dispersed throughout the filaments. (When used, styrene polymers will also form a discontinuous phase.) Specifically excluded from this definition are bicomponent and multicomponent filaments, such as sheath core or side-by-side filaments made of two different types of polymers or two of the same polymer having different characteristics in each region. This definition does not exclude other polymers being dispersed in the filament, and additives and ingredients being present.

The filaments can be round or have other shapes, such as octalobal, delta, sunburst (also known as sol), scalloped oval, trilobal, tetra-channel (also known as quatra-channel), scalloped ribbon, ribbon, starburst, etc. They can be solid, hollow or multi-hollow, and are preferably solid.

The filaments of this invention can have crimp such as in the case of a bulked continuous yarn or textured yarn, but the advantages of this invention can be seen in uncrimped yarns such as partially oriented yarns, spun draw yarn or other uncrimped yarns, such as those used in many nonwovens.

By "continuous" the filaments are being described using conventional terminology used in the art, and it should be readily recognized that this term is used to describe long filaments, thus distinguish the filaments from staple fibers or other short fibers.

A wide variety of filaments can be prepared according to the invention. Typically filaments for most uses, such as textile and carpet, have a size of at least about 0.5 dpf (denier per filament), and up to about 35 or more dpf. Monofilaments are larger and can be about 10 to about 2000 dpf.

Preferably the continuous, biconstituent filaments are spun at a speed of about 1000 to about 8000 meters/minute (m/min), more preferably about 2800 to about 5000 m/min, and even more preferably about 2800 to about 4000 m/min. For the purposes of this document, spin speed is the maximum speed used during the spinning process, and depending on the process used is typically measured at the draw roll or feed wheel. By "draw roll" speed, it should be understood that reference is being made to the draw speed directly after extrusion such as in spun drawn yarn process, and not the separate draw process that might be a second process carried on after winding the filaments such as a draw-texture process applied to a partially oriented yarn.

The partially oriented yarns, spun drawn yarns, and textured yarns described below are used to prepare textile fabrics, such as knitted and woven fabrics.

Partially oriented yarns of poly(trimethylene terephthalate) are described in U.S. Pat. No. 6,287,688, U.S. Pat. No. 6,333,106 and U.S. Pat. No. 6,672,047. The basic steps of manufacturing partially oriented yarns including spinning, interlacing and winding poly(trimethylene terephthalate) filaments are described therein. This invention can be practiced using those steps or other steps conventionally used for making partially oriented polyester yarns.

Preferably, prior to spinning the blend is heated to a temperature above the melting point of both the poly(trimethylene terephthalate) and PLA polymer, and extruding the blend through a spinneret and at a temperature of about 180 to about 270° C., preferably at least about 220° C. and up to about 260° C. Higher temperatures are useful with lower residence times. While heated, as during blending and in the spinneret feed, typically the holding time is 5 minutes or less and the temperature is below the effective transesterification temperature. The level of transesterification under these conditions is less than 2%. (Presently, transesterification cannot be quantified at 2% or less.)

The partially oriented yarns are multifilament yarns. The yarns (also known as "bundles") preferably comprise at least about 10 and even more preferably at least about 25 filaments, and typically can contain up to about 150 or more, preferably up to about 100, more preferably up to about 80 filaments. Yarns containing 34, 48, 68 or 72 filaments are common. The yarns typically have a total denier of at least about 5, preferably at least about 20, preferably at least about 50, and up to about 1500 or more, preferably up to about 250.

Individual filaments are preferably at least about 0.5 dpf (denier per filament), more preferably at least about 1 dpf, and up to about 10 or more dpf, more preferably up to about 7 dpf. Typical filaments are about 3 to 7 dpf, and fine filaments are about 0.5 to about 2.5 dpf.

Spin speeds can run from about 1800 to about 8000 or more meters/minute ("m/min."), and are preferably at least about 2000 m/min., more preferably at least about 2500 m/min., and most preferably at least about 3000 m/min. Spinning speeds of about 3200 m/minute frequently used to spin partially oriented yarns of poly(trimethylene terephthalate) are preferred.

The filaments are primarily discussed with typical 3 to 7 dpf filaments. Spin speeds for fine filaments are lower. For instance, poly(trimethylene terephthalate) multifilament yarns of fine filaments are presently spun at about 1800 m/minutes to about 2500 m/minutes or higher.

Partially oriented yarns are usually wound on a package, and can be used to make fabrics or further processed into other types of yarn, such as textured yarn. These fibers are not crimped. They can also be stored in a can prior to preparing fabrics or further processing, or can be used directly without forming a package or other storage.

Spun drawn yarn, also known as "fully drawn yarn", can also be prepared advantageously using the invention. The preferred steps of manufacturing spun drawn yarns including spinning, drawing, optionally and preferably annealing, optionally interlacing, and winding poly(trimethylene terephthalate) filaments are similar to those used for preparing poly(ethylene terephthalate) yarns. These fibers are not crimped.

These yarns are also multifilament yarns. The yarns (also known as "bundles") preferably comprise at least about 10 and even more preferably at least about 25 filaments, and typically can contain up to about 150 or more, preferably up to about 100, more preferably up to about 80 filaments. Yarns containing 34, 48, 68 or 72 filaments are common. The yarns typically have a total denier of at least about 5, preferably at least about 20, preferably at least about 50, and up to about 1,500 or more, preferably up to about 250.

Individual filaments are preferably at least about 0.1 dpf, more preferably at least about 0.5 dpf, more preferably at least about 0.8 dpf, and up to about 10 or more dpf, more preferably up to about 5 dpf, and most preferably up to about 3 dpf.

The draw ratio is at least 1.01, preferably at least about 1.2 and more preferably at least about 1.3. The draw ratio is preferably up to about 5, more preferably up to about 3, and most preferably up to about 2.5.

Draw speeds (as measured at the roller at the end of the draw step) can run from about 2000 or more m/min., and are preferably at least about 3000 m/min., more preferably at least about 3200 m/min., and preferably up to about 8000 m/min., more preferably up to about 7000 m/min.

Spun drawn yarns are usually wound on a package, and can be used to make fabrics or further processed into other types of yarn, such as textured yarn.

Textured yarns can be prepared from partially oriented yarns or spun drawn yarns. The main difference is that the partially oriented yarns usually require drawing whereas the spun drawn yarns are already drawn.

U.S. Pat. No. 6,287,688, U.S. Pat. No. 6,333,106 and U.S. Pat. No. 6,672,047, describe the basic steps of manufacturing textured yarns from partially oriented yarns. This invention can be practiced using those steps or other steps conventionally used for making partially oriented polyester yarns. The basic steps include unwinding the yarns from a package, drawing, twisting, heat-setting, untwisting, and winding onto a package. Texturing imparts crimp by twisting, heat setting, and untwisting by the process commonly known as false twist texturing. The false-twist texturing is carefully controlled to avoid excessive yarn and filament breakage.

A preferred process for friction false-twisting, as described in U.S. Pat. No. 6,287,688, U.S. Pat. No. 6,333,106 and U.S. Pat. No. 6,672,047, comprises heating the partially oriented yarn to a temperature between 140° C. and 220° C., twisting the yarn using a twist insertion device such that in the region between the twist insertion device and the entrance of the heater, the yarn has a twist angle of about 46° to 52° and winding the yarn on a winder.

When prepared from spun drawn yarn, the process is the same except that drawing is reduced to a very low level (e.g., draw ratio can be as low as 1.01).

These multifilament yarns (also known as "bundles") comprise the same number of filaments as the partially oriented yarns and spun drawn yarns from which they are made. Thus, they preferably comprise at least about 10 and even more preferably at least about 25 filaments, and typically can contain up to about 150 or more, preferably up to about 100, more preferably up to about 80 filaments. The yarns typically have a total denier of at least about 1, more preferably at least 20, preferably at least about 50, and up to about 1500 or more, preferably up to about 250.

Individual filaments are preferably at least about 0.1 dpf, more preferably at least about 0.5 dpf, more preferably at least about 0.8 dpf, and up to about 10 or more dpf, more preferably up to about 5 dpf, and most preferably up to about 3 dpf.

When prepared from partially oriented yarn, the draw ratio is at least 1.01, preferably at least about 1.2 and more preferably at least about 1.3. The draw ratio is preferably up to about 5, more preferably up to about 3, and most preferably up to about 2.5. Draw speeds (as measured at the roller at the end of the draw step) can run from about 50 to about 1200 or more m/min., and are preferably at least about 300 m/min. and preferably up to about 1000 m/min.

When prepared from spun drawn yarns, speeds (as measured at the first godet the filament contacts) can run from about 50 to about 1200 or more m/min., and are preferably at least about 300 m/min. and preferably up to about 800 m/min.

Poly(trimethylene terephthalate) bulked continuous filament ("BCF") yarns and their manufacture are described in U.S. Pat. No. 5,645,782, U.S. Pat. No. 6,109,015, U.S. Pat. No. 6,113,825, U.S. Pat. No. 6,740,276, U.S. Pat. No. 6,777,059 and US2004-198120A1. BCF yarns are used to prepare all types of carpets, as well as textiles.

Preferred steps involved in preparing bulked continuous filaments include spinning (e.g., extruding, cooling and coating (spin finish) the filaments), single stage or multistage drawing (preferably with heated rolls, heated pin or hot fluid assist (e.g., steam or air)) at about 80 to about 200° C. and at a draw ratio of about 3 to about 5, preferably at least about 3.4 and preferably up to about 4.5, annealing at a temperature of about 120 to about 200° C., bulking, entangling (which can be carried out in one step with bulking or in a subsequent separate step) optionally relaxing, and winding the filaments on a package for subsequent use.

Bulked continuous filament yarns can be made into carpets using well-known techniques. Typically, a number of yarns are cable twisted together and heat set in a device such as an autoclave, SUESSEN or SUPERBA, and then tufted into a primary backing. Latex adhesive and a secondary backing are then applied.

The invention can also be used to prepare monofilaments. Preferably monofilaments are 10 to 2000 dpf, and depending on the application are preferably 50-2000 dpf, more preferably 50-1000 dpf, and most preferably 100-500 dpf. Monofilaments, monofilament yarns and use thereof are described in U.S. Pat. No. 5,340,909, EP-A-1167594 and WO2001/75200, except that the spinning temperatures described above are used. While the invention is primarily described with respect to multifilament yarns, it should be understood that the preferences described herein are applicable to monofilaments. Monofilaments are used to make many different items, including brushes (e.g., paint brushes, tooth brushes, cosmetic brushes, etc.), fishing line, etc.

The following examples are presented for the purpose of illustrating the invention, and are not intended to be limiting. All parts, percentages, etc., are by weight unless otherwise indicated.

EXAMPLES

Materials

The PTT used for the filaments was SORONA semi-dull poly(trimethylene terephthalate) (E. I. du Pont de Nemours and Company, Wilmington, Del.), having an intrinsic viscosity of 1.02 dl/g and containing 0.3 wt % $TiO_2$.

The PLA used was PLA Polymer 4040D poly(lactic acid) from Cargill, Inc., Minetonka, Minn.

Test Method 1. Measurement of Intrinsic Viscosity

PTT and PAHA intrinsic viscosities (IV) were determined using viscosity measured with a Viscotek Forced Flow Viscometer Y900 (Viscotek Corporation, Houston, Tex.) for the polymer dissolved in 50/50 weight % trifluoroacetic acid/methylene chloride at a 0.4 grams/dL concentration at 19° C. following an automated method based on ASTM D 5225-92. The PTT measured IV values were correlated to IV values measured manually in 60/40 wt % phenol/1,1,2,2-tetrachloroethane following ASTM D 4603-96. See also U.S. Pat. No. 5,840,957.

Test Method 2. Tenacity and Elongation at Break

The physical properties of the yarns reported in the following examples were measured using an Instron Corp. Tensile Tester, Model no. 1122 (Instron Corp., Canton Mich.). More specifically, elongation to break, $E_b$, and tenacity were measured according to ASTM D-2256.

Example 1-5 and Comparative Example A

Mixtures of PTT and PLA were prepared, compounded and extruded, pelletized, and spun into filaments, using polymer compositions that contained 1% (Example 1), 2% (Example 2), 5% (Example 3), 10% (Example 4), and 20% (Example 5), all by weight of the polymer composition, PLA (the balance was PTT). Comparative Example A was PTT without added PLA and used as a control, and thus the blending steps were omitted. Properties are described in Table 1.

Pellets of PTT were dried to a moisture content of less than 40 micrograms/g polymer in a vacuum oven at 120° C. for a minimum of 16 hours. PLA pellets were dried to a moisture content of less than 40 micrograms/g polymer in a vacuum oven at 80° C. for a minimum of 16 hours. The dried pellets of both polymers were removed from the oven and quickly dropped in the desired weight ratios into a nitrogen blanketed supply hopper that was maintained at room temperature.

The pellets were fed to a 28-mm extruder (Warner-Flyter twin-screw Type 2SK-28-W8D12V, model #180-165, Ramsey N.J.) at 100 g/min. The extruder operated at a temperature of about 230° C. The extruded mixed polymer was extruded and cut into pellets.

The multifilament yarn was partially oriented yarn and the spinning comprised extruding the polymer blend through a spinneret, quenching, interlacing and winding the filaments.

Pellets were placed in a vacuum oven for drying for a minimum of 16 hours at 120° C. The dried pellets were removed from the oven and quickly dropped into a nitrogen blanketed supply hopper that was maintained at room temperature. The pellets were fed to a twin-screw remelter. The barrel heating sections were set to 240° C. for zone 1, 265° C. for zones 2 to 5, and 268° C. for zones 7-8. Pump block was 268° C., pack box heater was 268° C.

Pellets were extruded through a sand filter spin pack and a 34 round hole spinneret (0.012 inch (0.3 mm) diameter and 0.022 inch (0.56 mm) capillary depth holes) maintained at 273° C. The filamentary streams leaving the spinneret were quenched with air at 21° C., converged to a bundle and spin finish was applied. Forwarding rolls with a subsurface speed described in the Table 1 below delivered the yarn bundle to an interlace jet and then onto a windup running at the speed described in the Table 1 below. The spinning conditions and properties of the resultant partially oriented yarns are described in Table 1.

TABLE 1

Filament Properties

| Ex. | Polymer % PLA | Denier | Tenacity g/denier | Elongation % | Young's Modulus |
|---|---|---|---|---|---|
| Spin Speed 2500 m/min. | | | | | |
| A | 0 | 214.1 | 2.44 | 98.8 | 23.1 |
| 1 | 1 | 215.6 | 2.41 | 99.4 | 22.7 |
| 2 | 2 | 212.5 | 2.43 | 97.2 | 23.8 |
| 3 | 5 | 212.7 | 2.42 | 95.2 | 24.1 |
| 4 | 10 | 210.0 | 2.10 | 100.1 | 23.7 |
| Spin Speed 3000 m/min. | | | | | |
| A | 0 | 179.6 | 2.82 | 78.0 | 24.6 |
| 1 | 1 | 180.0 | 2.84 | 79.0 | 24.8 |
| 2 | 2 | 178.7 | 2.80 | 77.8 | 23.1 |
| 3 | 5 | 177.6 | 2.67 | 74.8 | 25.3 |
| 4 | 10 | 173.8 | 2.56 | 80.5 | 28.9 |
| Spin Speed 3500 m/min. | | | | | |
| A | 0 | 154.3 | 3.10 | 69.5 | 25.9 |
| 1 | 1 | 153.5 | 3.03 | 68.7 | 25.6 |
| 2 | 2 | 153.0 | 2.94 | 67.1 | 25.7 |
| 3 | 5 | 153.8 | 2.91 | 68.1 | 25.9 |
| 4 | 10 | 150.4 | 2.90 | 70.8 | 34.5 |

Table 1 shows the Young's modulus of filaments spun from PTT/PLA blends increased significantly with increasing proportions of PLA at the higher spinning speeds. Also the spinning properties, including denier, tenacity, and elongation, of PTT/PLA blends were comparable with PTT alone. Attempts to spin the PTT/PLA blend of Example 5 (20% PLA) were unsuccessful due to filament beaks, so no data is presented.

The foregoing disclosure of embodiments of the invention has been presented for purposes of illustration and description. It is not intended to be exhaustive or to limit the invention to the precise forms disclosed. Many variations and modifications of the embodiments described herein will be obvious to one of ordinary skill in the art in light of the disclosure.

What is claimed is:

1. A process of preparing the continuous, biconstituent filament, comprising the steps of (a) providing a melt composition comprising poly(trimethylene terephthalate) and about 0.5 to about 18 weight %, by weight of the composition, of poly(alpha-hydroxy acid); and (b) forming continuous, biconstituent filaments from the composition, wherein poly(trimethylene terephthalate) forms a continuous phase and poly(alpha-hydroxy acid) forms a discontinuous phase and is dispersed throughout the continuous, biconstituent filaments.

2. The process of claim 1, wherein the forming the continuous, biconstituent filaments comprises spinning the filaments at a speed of about 1000 to about 8000 m/min.

3. The process of claim 1, wherein the melt composition comprises about 82 to about 95.5 wt %, by weight of the filament, of the poly(trimethylene terephthalate).

4. The process of claim 1, wherein the poly(alpha-hydroxy acid) is polylactic acid.

5. The process of claim 4, wherein the polylactic acid is a bio-dervied polymer.

6. The process of claim 1, wherein the poly(trimethylene terephthalate) is made with a 1,3-propane diol prepared by a fermentation process using a renewable biological source.

7. The process of claim 4, wherein the poly(trimethylene terephthalate) is made with a 1,3-propane diol prepared by a fermentation process using a renewable biological source.

8. The process of claim 5, wherein the poly(trimethylene terephthalate) is made with a 1,3-propane diol prepared by a fermentation process using a renewable biological source.

* * * * *